US011941226B2

(12) United States Patent
Shaffer

(10) Patent No.: US 11,941,226 B2
(45) Date of Patent: Mar. 26, 2024

(54) MULTIMEDIA CONTENT BASED TRANSACTIONS

(71) Applicant: Fabzing Pty Ltd, Main Beach (AU)

(72) Inventor: Jon Frank Shaffer, Main Beach (AU)

( * ) Notice: Subject to any disclaimer, the term of this patent is extended or adjusted under 35 U.S.C. 154(b) by 56 days.

(21) Appl. No.: 16/388,634

(22) Filed: Apr. 18, 2019

(65) Prior Publication Data

US 2019/0339823 A1 Nov. 7, 2019

Related U.S. Application Data

(63) Continuation of application No. 15/301,393, filed as application No. PCT/IB2015/052382 on Apr. 1, 2015, now abandoned.

(30) Foreign Application Priority Data

Apr. 2, 2014 (AU) ................................ 2014901194

(51) Int. Cl.
| | | |
|---|---|---|
| *G06F 3/0482* | (2013.01) | |
| *G06F 40/134* | (2020.01) | |
| *G06F 40/166* | (2020.01) | |
| *H04L 51/00* | (2022.01) | |
| *H04L 51/08* | (2022.01) | |
| *H04L 51/52* | (2022.01) | |
| *G06Q 50/10* | (2012.01) | |

(52) U.S. Cl.
CPC .......... *G06F 3/0482* (2013.01); *G06F 40/134* (2020.01); *G06F 40/166* (2020.01); *H04L 51/00* (2013.01); *H04L 51/08* (2013.01); *H04L 51/52* (2022.05); *G06Q 50/10* (2013.01)

(58) Field of Classification Search
CPC ....... G06F 3/0482; H04L 51/32; H04L 51/00; H04L 51/08; G06Q 50/10
See application file for complete search history.

(56) References Cited

U.S. PATENT DOCUMENTS

| | | | |
|---|---|---|---|
| 5,781,683 A | 7/1998 | Sakoguchi | |
| 7,035,803 B1 | 4/2006 | Ostermann et al. | |
| 8,312,486 B1 * | 11/2012 | Briggs | H04N 21/8455 725/32 |

(Continued)

FOREIGN PATENT DOCUMENTS

| | | |
|---|---|---|
| CN | 102830977 A | 12/2012 |
| WO | 2012/12155 A2 | 9/2012 |
| WO | 2015/151037 A1 | 10/2015 |

OTHER PUBLICATIONS

Australian Patent Office, Written Opinion of the International Searching Authority for Application No. PCT/I2015/052382, dated Jul. 6, 2015.

(Continued)

*Primary Examiner* — Phenuel S Salomon

(57) ABSTRACT

A transaction application implemented on a computing device for automating personalized multimedia based on user preferences and multimedia content for improving the rate of completing transactions, wherein the application is used when an application is executed on the computing device and identifies multimedia content and a transaction type, and uses preferences of the user to configure a personalized multimedia content output for completing the transaction.

2 Claims, 6 Drawing Sheets

(56) References Cited

U.S. PATENT DOCUMENTS

| | | | |
|---|---|---|---|
| 8,473,490 B2* | 6/2013 | Bonilla | G06Q 10/10 707/732 |
| 8,769,053 B2* | 7/2014 | Spitz | G06Q 30/0601 709/219 |
| 10,389,712 B2* | 8/2019 | Steeves | H04W 12/06 |
| 10,943,471 B1* | 3/2021 | Giobbi | G07F 17/32 |
| 2005/0049933 A1* | 3/2005 | Upendran | G06Q 30/02 705/26.41 |
| 2006/0020990 A1 | 1/2006 | McEneaney | |
| 2007/0078832 A1 | 4/2007 | Ott | |
| 2007/0094715 A1* | 4/2007 | Brown | G06F 21/34 726/5 |
| 2007/0208751 A1* | 9/2007 | Cowan | G06Q 10/10 |
| 2007/0266090 A1 | 11/2007 | Len | |
| 2007/0271366 A1* | 11/2007 | Demers | G06F 16/44 709/223 |
| 2008/0004892 A1* | 1/2008 | Zucker | G06Q 30/00 705/7.28 |
| 2008/0091527 A1* | 4/2008 | Silverbrook | G06Q 30/02 705/14.55 |
| 2009/0024943 A1* | 1/2009 | Adler | G06Q 30/0601 715/764 |
| 2009/0133090 A1* | 5/2009 | Busse | H04N 21/4755 725/132 |
| 2009/0146779 A1* | 6/2009 | Kumar | G08C 17/02 340/5.31 |
| 2009/0234861 A1* | 9/2009 | Ramer | G06F 16/635 |
| 2010/0079243 A1* | 4/2010 | Hamada | G06F 21/32 340/5.83 |
| 2010/0251280 A1* | 9/2010 | Sofos | G06Q 30/0631 725/14 |
| 2011/0004517 A1* | 1/2011 | Soto | G06Q 30/0251 705/14.51 |
| 2011/0145897 A1* | 6/2011 | Tyree | G06F 21/42 726/6 |
| 2011/0185354 A1* | 7/2011 | Tanner | G06F 8/61 717/178 |
| 2011/0225417 A1 | 9/2011 | Maharajh | |
| 2012/0246191 A1 | 9/2012 | Xiong | |
| 2013/0042261 A1* | 2/2013 | Tavormina | H04N 21/4725 725/5 |
| 2013/0151352 A1* | 6/2013 | Tsai | H04N 21/4438 705/14.73 |
| 2013/0218721 A1* | 8/2013 | Borhan | G06Q 30/02 705/26.41 |
| 2013/0339374 A1* | 12/2013 | Skeen | G06F 16/639 707/754 |
| 2014/0092424 A1 | 4/2014 | Grosz | |
| 2014/0195921 A1 | 7/2014 | Grosz | |
| 2014/0244429 A1* | 8/2014 | Clayton | G06Q 30/0631 705/26.7 |
| 2014/0244447 A1* | 8/2014 | Kim | G06Q 30/0643 705/27.2 |
| 2015/0012426 A1* | 1/2015 | Purves | G06Q 20/321 705/41 |
| 2015/0371215 A1* | 12/2015 | Zhou | G06Q 20/384 705/71 |
| 2016/0269417 A1* | 9/2016 | Saxena | H04L 63/06 |
| 2019/0141021 A1* | 5/2019 | Isaacson | G06Q 30/0625 |

OTHER PUBLICATIONS

2 Australian Patent Office, International Search Report for Application No. PCT/IB2015/052382, dated Jul. 6, 2015.

* cited by examiner

MULTIMEDIA CONTENT BASED TRANSACTIONS

RELATED APPLICATIONS

This application is a continuation of application number WO 2015/151037 A1, filed internationally on Apr. 1, 2015, which claims the benefit of provisional application number, filed on Apr. 2, 2014, the entire contents of each being incorporated by reference herein.

BACKGROUND OF THE INVENTION

The use of personal computers and smart phones have made purchasing easier with products and purchasing a click away. Advancing this area further, transaction applications and websites are an increasingly popular form of conducting business and are bombarding the user with more suggestions of items that they may like. Access to purchasing products, tickets, banking, or other transactions is becoming progressively easier as the seller direct websites, links with the user's social media applications, for example private advertising marketing via Facebook and LinkedIn directing internet traffic to the seller's website. Users are exposed to advertising with many applications that they are using. Additionally, there are websites dedicated to selling, such as Amazon may allow purchases through its website and uses a basic format to display possible products that meet your search criteria. In addition, applications such as YouTube interrupt videos being played on the device to show an advertisement much to the irritation of the user. The use of personal devices and computers has made advertising even more powerful, but the problem persists for retailers, users are not completing transactions all the time and the rate of shopping cart abandonment is increasing.

Currently, to address the problem of failure to complete the transaction and leaving items in a virtual shopping cart, retailers and application or website hosts are sending users emails or notifications reminding them that items remain in their cart. However, with all the advertising and shopping becoming progressively easier, users are becoming more distracted or reluctant to complete the transaction by paying for items. As data exchange becomes faster and retailer websites become unlimited, the ability to purchase a desired item becomes more readily available. Despite the increasing number of applications, application content, retailer websites, number of retailers and targeted advertising available today, the problem still persists that users are not completing transactions and paying for items selected, such as placed in a virtual shopping cart. All of the targeted advertising connected with applications and advertising for more and more products has created the problem of becoming distracted with all of the other advertising suggested through target marketing. Another cause is when the site transfers you for the purchase to another URL or application, including those via social media or as adjuncts to other software applications or redirected websites.

It is an object of the present invention to provide additional functionality and personalization for transactions and improve the completed transaction rate of users.

SUMMARY OF THE INVENTION

The present invention relates to a device, method and system transaction application with multimedia content based transactions that provides a user interface which incorporates content personalized to the user and incorporates a transaction area for completing a transaction that does not transfer the user out of current website or application to make the purchase. The application creates a personalized environment specific to the user with different areas of content related to the transaction type. The content is pulled from multimedia and user preferences and some other sources. The content is specific to the product of interest and encourages the user to complete the transaction. The personalized environment may include the graphical display output, audio, flashlight, or any other hardware on the personal device. The personalized environment may include at least one video. In a preferred form, the content of the personalized environment is automatically personalized for the user while engaged in a transaction.

The multimedia content based transaction application provides an enhanced transaction experience through a personalized environment within a transaction application. The transaction application may launch when using another application, such as YouTube, when the user is executing an app. The transaction application then determines the content of the video playing, for example a virally trending jeans video. As the user watches the video, the transaction application determines the user's preferences based on user history of the applications, content of the applications and user input selecting and inputting information at any time. User preferences may be a preferred application or video game. It may include preferred music from the user's Spotify account or a commonly used font when writing to friends. The user may have a favorite .gif file that was sent many times to friends that include someone wearing jeans. All of the content determined then is arranged in a format surrounding the jeans video on YouTube (or anywhere on the screen). For example, the jeans .gif file appears next to a sms in a favorite font that says "love jeans." A meme is playing saying "you are awesome" to encourage the purchaser. Emojis and stickers may also be part of the multimedia used to maintain the user's engagement in jeans. Once the user clicks on an object, either any object or an object for ordering jeans such as a button marked "order now," then an area of the determined multimedia content will display a virtual shopping cart with containing pair of jeans. The virtual shopping cart does not affect what the user is seeing in the rest of the screen and the user is not transferred to another app for purchasing or another website URL. The user remains in their personalized environment with all the personalized multimedia content displayed.

To engage the user, the transaction application works with any type of multimedia. It can be any type of video, image, audio, game, virtual reality, gif, meme, sms, text, light effect, emoji, stickers, device vibrating, etc., to depending on user preferences. The application may also select anything from the web related to the target subject matter, i.e., jeans, and may be based on user preferences for internet browsing. The transaction application determines the most preferred application. In this example, a video is used as one type of multimedia and may have been a video selected automatically from pre-selected set. It may have been selected by the user, such as the jeans advertisement. A different video may play as another form of multimedia. as the jeans ad is playing or other none video related media may be used as content.

In one example, the user may indicate that they want to order the item in the virtual shopping cart by an action, such as selecting the "place order" button, again without redirecting the user, the transactional application will update the virtual cart to be a billing/payment site and personal information. The multimedia content may remain the same, or the multimedia may change to billing content that encourages the user to complete the transaction.

Once the user indicates completing the order, by pressing a "place order button" or other requisite act indicating to complete purchase. Other acts may include voice commands, shaking or rotating the device, or other action indicated by the device. Once the requisite action, or task, is complete, then the device will display a receipt. The receipts again may not change the output display. In some examples, it may update the billing area with the receipt information. In some examples, the application may maintain the same multimedia, or the application may update the multimedia around the receipt with congratulatory content, or other preferred content, such as games or favorite emojis, etc.

If the user returns to the site, for example to watch the same jeans video on YouTube, then the transaction application may determine to use different multimedia content or may use the same content. Either the transaction application or the user may select return site visit preferences.

The content is not limited to the examples herein, but includes any multimedia content available to the transaction application through applications on the device, websites, authorized accounts of the user, or on a remote server associated with the device. Additionally, video may include but not limited to live streaming video, broadcast content live or delayed, Virtual Reality, Augmented Reality, biometric, etc.

In implementations, the transaction may be customized automatically by including information and content specific to the user, type of transaction, or both. This may be, for example, adding names of the user, recipient and/or sender of content of the multimedia, adding specific images or video, adding specific text, or adding specific audio. In other implementations, the transaction may be customized based on user input. The user may select certain preferences with regard to each type of multimedia in the graphical user interface. The user selections may be used for future automated customizations. The multimedia is customized to the user's preferences, either automatically determined and/or based on user input, and the transactional application use the multimedia to encourage the user to complete the transaction focused on the type of transaction.

In suitable implementations, the content of the multimedia during a transaction, apart from some level of automated customization, may be provided by the operator. Alternatively, it may be provided by the user, or it may be based on content determined to be relevant from the user's stored content associated with a plurality of applications at the device. with the content selected and defined in advance of the sticker being attached. In some implementations, the content is a mixture of the above. The content of the multimedia may similarly be provided by the user, by the operator, or either.

Another aspect of the application is healthcare. The transaction is based on a physical action to complete the transaction. In healthcare, for example, the user may be a patient. Utilizing the camera, microphone, motion sensors, or other hardware of the device, the user may exercise or take a pill and within view (or audio range) of the user's phone, computer, webcam, or other device, and thereby constituting a transaction by performing the requisite action within the scope of the prescription or therapy, etc.

Transactions in this disclosure are used not just to mean shopping, but in the broadest sense. For example, transactions in this disclosure include completing a task to enable the application to update the tracked information. In the previous example, it was selecting a purchase button "purchase now" to complete the transaction and empty the virtual cart after purchasing. In one example a task may be selecting an object within the multimedia that is part of the application's user interface, so that a virtual shopping cart is automatically updated with goods related to the object selection. The tasks are not limited to object selection but may include an action that interacts with the multimedia or the hardware of the device. In another example, the transaction type may be related to healthcare such as physical therapy and the task could mean performing an exercise, which is captured with the video camera of the device, in a physical therapy session to get credit in an exercise plan. Other transaction types may relate to purchasing tickets to concerts or paying bills with an app or online or betting on an event while watching the event live or pre-event media about the event or watching a sporting event and betting or purchasing team memorabilia. Transactions may include grocery shopping while streaming a cooking show. For example, watching a cooking show and viewers are able to see the recipe underneath/order all the ingredients with everything delivered shortly thereafter by the grocery store. The cooking show and viewing experience is not interrupted while the sponsoring grocery store chain has very quantifiable sales data tied directly to the content. In another example, the transaction type may relate to booking hotels, hailing taxi/Uber, and or purchasing duty free goods from your video airline ticket, placing a bet on a sporting event while viewing the broadcast, buying a band's merchandise or instruments from a music video. In other examples, a user may purchase a wardrobe item being worn by a news presenter while watching the news or purchase a dress worn by a presenter at an awards ceremony while streaming the event live. The news presenter may be informing the public regarding a tragic event and the user can donate money to a cause to provide relief to the victims or support a cause, making donations easier to make and avoid fake or imposturous causes. In the political area, a user may vote or poll for a candidate while viewing their campaign material. Real estate may also be possible for the transaction application, for example the user may make a real estate appointment to inspect a house while viewing an advert about the home. Make-up tutorials are popular and a viewer may purchase cosmetics while watching a make-up tutorial. A gamer may purchase upgrades or improvements to their account while engaged in a game. These are just a few of the task examples possible to improve task or transaction completion. Transactions are meant as a broad term to encompass such all tasks that the user may complete online with the present transaction application on their personal computing devices.

It will be apparent that the present invention accordingly provides a way for a transaction to entail a much more meaningful, effective, and elaborate set of content than the existing uses of transaction applications and intended to help the user complete the transactions by personalizing it to the user. It automates the multimedia content selection process with accuracy and focuses the user into completing the transaction without all the other marketing and multimedia distractions. Moreover, implementations of the present invention allow for the user to be exposed to personal multimedia that encourages the user with regard to the type of the transaction.

The transaction application herein may be pre-loaded to each new device and may apply to all programs displaying content at the graphical user interface. The application may be downloadable or part of an application update. Throughout this disclosure, several exemplary embodiments are described based on either a method, a computer program or a system. However, one skilled in the art would be able to implement the invention in at least one of method, system, and computer program product.

Further, the implementation at the content, social media and network side may be variable and adapted to the requirements and norms of that facility or transaction type. Further, the targeted advertising determining user preferences may be adapted to the multimedia and the multimedia content to engage the user. The present invention is intended to encompass all such implementations.

Techniques of this disclosure may provide one or more advantages. For example, by automatically identifying multimedia content and personalizing the content to the user's preferences during a transaction while executing at least one application from a plurality of application limits the distraction from using the device and encourages the user to complete the transaction through the media while helping the user stay focused on completing the transaction. Techniques of this disclosure may reduce the amount of time required to look at too much unrelated content generated by advertisers to purchase other goods and keep looking around. Further techniques of this disclosure improve rates of completing the transaction by staying on the same site, so the user is not distracted with new content in a different format of the site/application where you are redirected. Computers have created so much content being displayed with the intention of distracting the user, notifications to the user, that the user cannot complete the tasks during a transaction.

Web based transactions in their current format are typically text based, static, and boring requiring a number of different pages or stages to be completed leading to extremely poor conversion rates. Shopping cart abandonment rates, for example, in 2018 were 76% and getting progressively worse over the past decade (compared to 59.8% in 2006) due to the ever increasing distractions caused by computing devices. By using this innovative way of multimedia, in one example viewing live stream content on a multimedia purchasing, betting, cooking, healthcare, education, gaming, etc., the personalized engagement platform improves the rate of task completion while executing an app, such as completing a purchase while streaming a video. The transaction application also allows viewers to engage, interact, and transact directly with sports content, travel, advertising, news, politics, entertainment, video viewing, streaming, and events in real time without having to go to another URL. The multimedia output of the transaction application is configured to include a notification associated with the transaction type for completing the transaction, then the user is not redirected (the application is not redirected) to a new application or URL.

In alternative preferred embodiments, the computer program product embodied in a non-transitory computer readable storage medium further comprises programming instructions causing the coupled computer to filter a plurality of content from the remote server.

The articles "a" and "an" are used herein to refer to one or to more than one (i.e., to at least one) of the grammatical object of the article. By way of example, "an element" means one element or more than one element. As used herein, the use of the singular includes the plural (and vice versa) unless specifically stated otherwise. Throughout this specification, unless the context requires otherwise, the words "comprise," "comprises" and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present.

The details of one or more examples are set forth in the accompanying drawings and the description below. Other features and/or advantages will be apparent from the description and drawings, and from the claims.

DETAILED DESCRIPTION

Figure 1:
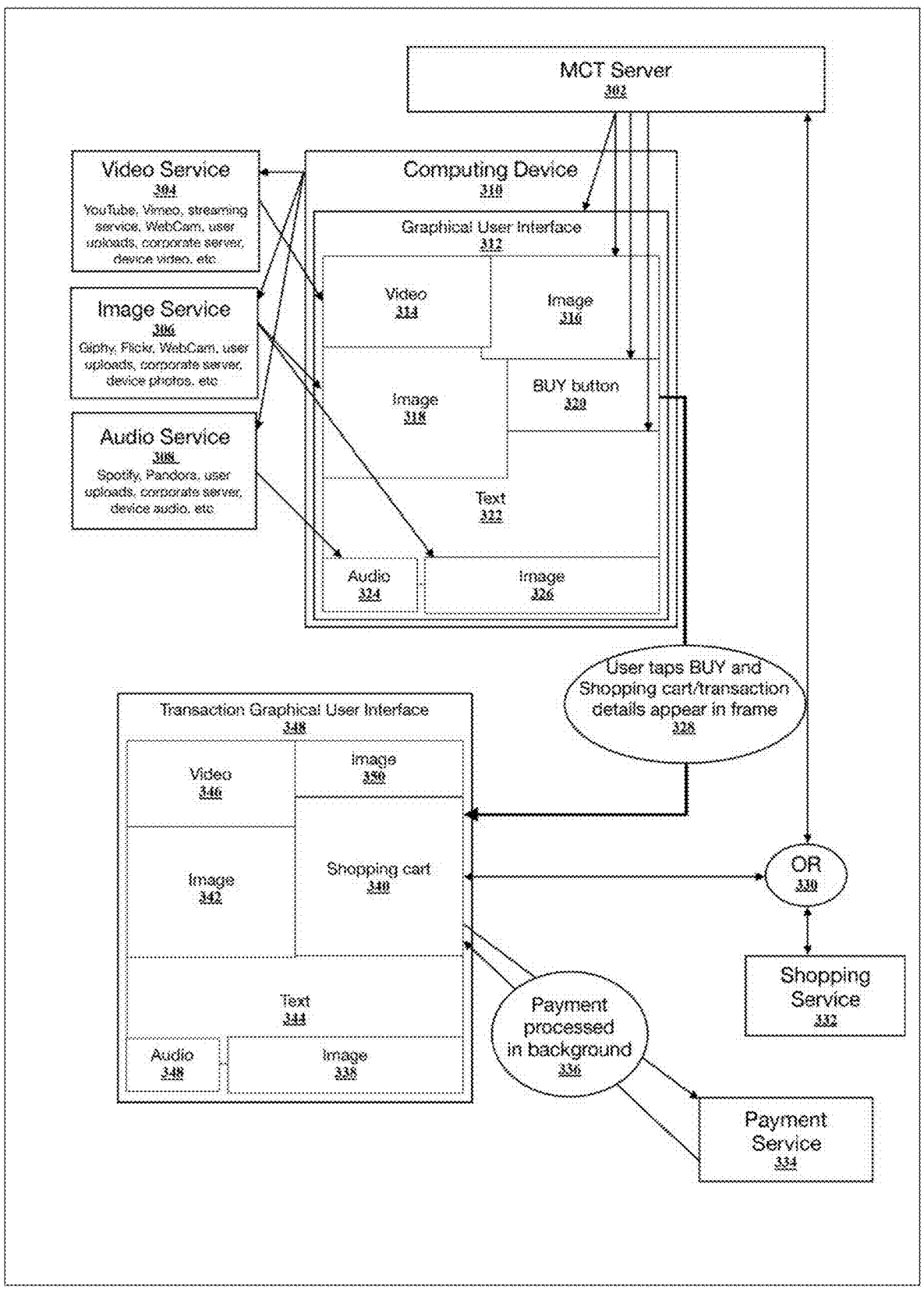
FIG. 1 is a conceptual flow diagram illustrating a system with a computing device executing one or more of multimedia content transaction techniques, in accordance with one or more aspects of the present disclosure.

In general, this disclosure is directed to techniques that may enable a computing device to filter all incoming and outgoing content displayed on the graphical user interface of the computing device thereby allowing the user of the filter to control what content is viewed on the device. Content may include photos, pictures, videos, text, sound, graphics, The term 'network' is intended in its broadest sense. It includes public and private networks, illustratively those applying TCP/IP protocols such as the internet, but not limited to such networks. They may be local area networks (LANs), wide area networks (WANs). The physical implementation of such networks may be fixed, wireless, optical, satellite, mobile or any other suitable form.

The present invention may be conveniently implemented using a server based virtual facility, such as the facility operated by the applicant as FabZing. Details of the implementation of this system are provided in the applicant's patent application No WO 20112041827 (U.S. 61/272,545) and U.S. provisional application No. 61/746,774 by J Frank Shaffer. These disclosures are hereby incorporated by reference. A suitable implementation of a server based, user controlled multimedia transaction system is the FabZing system, which is available at www.fabzing.com and is commercially operated by the present assignee. Of course, any other suitable system may be used to implement the invention. Further details of using at least one video component as multimedia with content in transactions is described in WO 2015/151037 A1 and is incorporated herein by reference.

The multimedia content based transaction application chosen may be any suitable one, such as the specific examples mentioned above, social media or any other type of online transaction. Transaction is meant is the broadest sense, as a task performed by the user interacting with the device to cause the multimedia to change, such as adding an item in a virtual shopping cart, or in another example capturing video of the user doing an exercise as part of physical therapy compliance. The content of the multimedia may include icons, videos, images, gifs, meme, sms, email, text, stickers, websites, messaging, augmented reality, virtual reality, sound, graphics, and light effects, gif, stickers, projections, text, audio, or other objects form other applications and may be part of the user interface environment, which may include the graphical user interface. The multimedia used in the personalized environment may include content from the user's device or are based on preferences of the user. It can also include selected items or multimedia types preselected by user or preferred by user. The multimedia object may be included in the selected and attached or added to a transaction by a user. The present invention is not limited to any particular mode of selection, and in general it is preferred that the normal mode within the selected transaction system is used.

The term operator is used to refer to the party which is providing the server and associated software to deliver the enhanced stickers. This may be multiple parties, depending upon commercial arrangements, and may or may not be the operator of the transaction application. The term is intended to encompass both those in operational control and overall ownership or control.

The term video is used to refer to any kind of moving image format, including for example Mpeg and images format that can be used to form a moving image, such as gifs.

The present invention is envisaged as being implemented primarily as an application which is selected or sold in the usual way for the transaction application. The example provided is in this context. However, the functionality could be incorporated within the functions of the transaction system itself in a suitable implementation.

FIG. 1 is an example of a transaction application implemented on a computing device 310. In the example, a user is executing the transaction application at a graphical user interface 312 and is prompted to complete a shopping transaction. Computing device 310 may have many different applications that can be executed by the device, such a web browser, YouTube, a personal banking app, shopping applications, retailer applications, travel, email, Social Media (Facebook, LinkedIn, SnapChat, Twitter, healthcare provider, etc.), purchasing, healthcare following professional's orders or physical therapy plan, education, tuition, donations, e-signatures, billpay, financial transactions, betting, email, sms, messaging, and many others. Each user can select from a number of applications on computing device 310. When the applications are executing, each application may contain multimedia as part of the application. In addition to the multimedia, the user may also see advertisements appearing on the screen, receive notifications from other applications executed by computing device 310. These may become distracting as the user tries to focus on the executing application. Further, in the example of the user watching a YouTube video, the video may be a trending jean commercial with popular music playing. The user may be seeing the people in the video wearing various jeans and clothing sold by the jeans company. The user, while watching the video, may see a pair of jeans that they like and want to purchase these jeans. The jeans company that made the video wants to keep the user of computing device 310 that is viewing their advertisement engaged and interested in the company's products, without the user being distracted by the other notifications, advertisements, transfer to another URL site or application of computing device 310, and other distractions that may prevent the user from purchasing the item that they want and completing the transaction. The transaction application keeps the user interested in the goods of the advertisement as it continues to play and focuses the graphical user interface for the user without all the distractions and extra steps, so the user is more likely to purchase the jeans seen in the advertisement.

The transaction application executed may make the purchase of the desired jeans easier and limit the number of distractions away from purchasing, including keeping the user at the same graphical display without rerouting the application for purchasing display content. For example, while YouTube executes at computing device 310 with the jeans advertisement and music, the transaction application may execute at computing device 310 and communicate with a Multimedia Content Based Transaction ("MCT") Server 302. Computing device 310 may send and receive data with MCT server 302 regarding the content of the jeans advertisement. In some examples, the data sent may include they type of video being executed, the objects of the video being executed, data about the user's use of YouTube, data associated with the user such as demographics and recent application use and inputs by the user while using the many possible applications of computing device 310. For example, the user may regularly select a gif or meme to send to friends or the user may prefer certain fonts while writing messages or emails to friends. These inputs and interactions of the user with the applications are data used in determining the user's preferences to certain applications and settings of the applications. Preferences may also include language, geographical data, cultural data, date and time, other meta data, in addition to any input data by the user or determined by any of the applications of computing device 310. MCT server 302 may search for content in its remote server or within a network, to find content that would likely match the user's preferences. The MCT server and/or the transaction application may also search computing device 310 for content stored directly on the device. In other example, MCT server 302 and/or the transaction application may use account information to access account in remote server location or networks to find user preferred content. For example, MCT server 302 may use account data associated with the user's audio service 308, such as Spotify, Pandora, user uploads, Apple Music, device audio, that can be local to computing device 310 or communicate with a remote service, such as streaming or Spotify. In the example of Spotify, computing device 310 may have an associated Spotify application at computing device 310 to determine preferred music of the user based on the user's playlists, stations, music types, and recently heard music, as well as trending music similar to the user's music use. Spotify is not a limiting example, as other accounts and application base access to remote server content is within the scope of this disclosure. The transaction application may communicate with image service 306, such as Giphy, Flickr, webcam services, user uploads, a corporate server with an image storage, locally stored photos, and may exchange information about likely user preferred content. Computing device 310 may access its hardware components such as the webcam, microphone, speakers, etc. to gather user input and user preferences. In this example, Image service 306 may then determine images that are relative to the user's preferences and the application executing at computing device 310 in real-time, such as a jeans ad being watched by the user with YouTube.

Video services 304 may also communicate with computing device 310 for executing videos at graphical user interface 312 and transaction graphical user interface 348. In this example, video service 304 may include YouTube, streaming, Vimeo, webcam hardware of computing device 310, user uploads, corporate server of another video related company, WebCam, and others. Video service 304 may also relate to augmented reality and virtual reality services. Video service 304 may send to computing device 310 information relating to the video being executed at the computing device graphical user interface 310. For example, information may include a transaction type, such as purchasing jeans from the retailer of the advertisement. In other examples, the content of the transaction may be to download or purchase music being played in the advertisement. The video executed at video 314 and video 346 may include a beautiful travel destination, so the transaction may be to purchase tickets. Any content in of the video shown on graphical user interface 312 or graphical user interface 348 may associate with a type of transaction as well as any related retailer information, other products, etc. Transaction application may analyze all data associated with the video to determine a possible transaction type. In this example, the transaction is purchasing jeans as advertised by the retailer. However, this is not a limiting example and other transaction types are available for this disclosure.

Additionally, this jeans advertisement example is not limited to only the type of content as illustrated in the example of FIG. 1. In other examples, the transactional application of computing device 310 may receive from MCT server 302 data for outputting at the graphical user interface 312. The information received may include other types of multimedia that the user would likely prefer and is related to the transaction of purchasing jeans. The transaction application may determine an output at the graphical user interface that includes received multimedia content. For example, the multimedia may include displaying multimedia at the graphical user interface, such as graphical user interface 312, that it is a collage of multiple areas of multimedia content. In the example of FIG. 1, graphical user display 312 may include a collage of multimedia, such as video 314, image 316, BUY button 320, text 322, image 318, audio 324, image 326, and others are possible. In some examples, audio may be playing on the device, but not shown in FIG. 1, such as music and there may be other effects for example light effects or device vibration as part of the multimedia. As the user watches the jeans video at video 314, the areas of image 316 and image 318 may display a photo of jeans or product information. A text message with a user preferred font may appear in text 322. In another example, an encouraging gif file may appear in image 326. While all these multimedia areas display content related user preferences creating a personalized environment at graphical user interface 312, the jeans video continues to play. There is an overwhelming amount of content that is available today, and much may effect, directly or indirectly, the user completing the purchase of a pair of jeans if a personalized analysis is not applied.

In some examples, graphical user interface 312 may include BUY button 320. When the user taps or selects BUY button 320, then the area where the BUY button 320 appeared may change to a new display output with different content, such as transactional graphical user interface 348. In some examples, the BUY button 320 may change to a virtual shopping cart 340, that is the same, smaller or larger size area of graphical user interface 312. The transactional graphical user interface 348 of computing device 310 may, in some examples, have the same content as to limit customer distraction. In other examples, transactional graphical user interface 348 may change the content of all or some of the content areas of image 350, image 342, text 344, audio 352, or image 338. It may add more multimedia content areas or remove some of the multimedia content areas depending on the user's history of transactions. The personalized multimedia output at transaction graphical user interface 348 is configured to include a notification associated with the transaction type for completing the transaction, then the at least one application remains the same and the device does not redirect the application to a new application or URL. The notification may be shopping cart 340 that allows the user to complete the transaction.

The transactional application may use weighting techniques and other prediction techniques to review all the content to be added to the graphical user interfaces 312 and 348 to improve the likelihood of the user completing the transaction, such as purchasing the jeans in the shopping cart. The transaction application may also use current or previous user inputs when items were successfully purchased to update preferences associated with the user. For example, the use may be more likely to purchase the jeans when fewer multimedia content appears in graphical user interface 312, so after BUY button 320 is selected, then less multimedia content will appear in transaction graphical user interface 348 with the shopping cart, such as removing text 344 from the display content. The transaction application stores user input and success factors at computing device 310, remote MCT server, or both. In the example of when the weighting technique is used, all of the data analyzed in determining a preference is assigned a score or value. A threshold may be applied to select content with a score higher than a predetermined minimum, or the content may not be selected by the transaction application or MCT server 302 if the content score is below a predetermined score. Scoring values that are applied may be stored in the transactional application or in MCT Server 302. These scores and values may be used for determining the likelihood of customer transaction completion and applied to other executed application and other transaction types for the user, and in some examples, for other users associated with MCT Server 302 and the network. Every type of content, application, meta data, etc. will be applied a score value. In some examples, when the user makes a purchase using the transaction application, or any application of computing device 310, then the transaction application will update score values with the user input. In other examples, score values may be updated when the user does not complete a purchase of the jeans order, and thus, the score is decreased reflecting the likelihood of completing the purchase. Prediction scoring and weighting may be continually updated by user interaction, and in some examples, may be updated based on network data. Through these techniques, the graphical user interface may be personalized so that it determined based on the users' preferences.

The transaction application may determine a transaction area, such as shopping cart 340 of transaction graphical user interface 348 that is a representation of a virtual shopping cart to represent when items are selected to be purchased, quantities, totals owed, and other virtual shopping cart information. The user may see shopping cart 340 after tapping on BUY Button 320, giving a voice command, shaking the device, or other interactive gestures or inputs that may initiate transactional graphical user interface 348 to include shopping cart 340. In some examples, MCT Server 302 may send and receive data to determine the transaction type based on content of computing device 310 and may determine shopping cart 340 as part of the output graphical display of transactional graphical user interface 348. In some examples MCT server may communicate, sending and receiving data, with shopping service 332. Shopping service 332 may provide data regarding products identified in video 314 or video 346 and other retail content. Matching, parsing, image identification, and other known techniques may be used for content identification. In some examples, shopping service 332 may provide content information about the jeans to be purchased or the transaction type. For example, shopping service 332 may determine that it's a retail transaction and may have images of the jeans, product information, pricing information, size information, care information, product video information, endorsements, and other advertising that can be used for content of shopping cart 340 or any of transaction graphical user interface 348. User preference determination techniques described herein can be applied to the content information from shopping service 332 for determining the content at transaction graphical user interface 348.

When the user indicates at the device that the transaction as indicated in shopping cart 340 that the transaction to purchase the jeans and the transaction should be completed. Indicating to complete the transaction can be tapping a graphical button at a graphical user interface, shaking the device, voice commands, or other predetermined action to mean complete the transaction. When the user wishes to complete the transaction, transactional application may communicate with a payment service 334 in the background, or locally at computing device 310. Payment processing may include transaction type information, credit card or other payment information, bank account or payment account information, authentication information, or accessing payment services such as PayPal, Apple Pay and Square for completing purchase of the jeans.

A method for customizing a recipient message within an instant messaging app, the method may comprise generating an electronic message configured for delivery within the messaging app, the message including a unique URL to a remote database. Further, the method may send the message to a recipient through the instant messaging app and after the unique URL is accessed by the recipient, assembling content at the remote server according to a layout code assigned to the unique URL delivered with the message, the layout code including a plurality of placeholders, at least one of the placeholders being configured for video, another of the placeholders being configured retrieve a name or image of the recipient who accessed the unique URL. The internet search tag may be configured to retrieve media. The method may further comprise playing the assembled content for the recipient from the remote server. The method may further comprise the steps of generating a display on a client device, receiving client information from the client device, transmitting a content template to the client device, executing information retrieval software in the client device so that the client device finds and retrieves media relating to the client information; and displaying a mashup on the client device using the retrieved media and according to the content template. The step of executing the information retrieval software in the client device is carried out so that the retrieved media includes media retrieved from the client device. The step of executing the information retrieval software in the client device is carried out so that the retrieved media includes media retrieved from various sources on the Internet.

A transaction application implemented on a computing device for automating personalized multimedia based on user preferences and multimedia content for improving the rate of completing transactions may include instructions and data comprising instructions, which when executed by at least one processor, configure the at least one processor to perform operations of the computing device, the operations comprising execute at least one application of a plurality of applications on a computing device associated with a user with multimedia content. The operations may further include identifying a transaction type, based on the multimedia content, determining preferences associated with the user and the multimedia content for improving the rate of transaction completion, wherein the multimedia content is associated with the plurality of applications of the computing device. The operations may further include configure a personalized graphical user interface that includes at least one multimedia display area based on the preferences associated with the multimedia content, and based on user input at the personalized graphical user interface, configure the personalized multimedia output to include a notification associated with the transaction type for completing the transaction. The operations may further include storing the transaction typed in an association with the configured personalized graphical user interface and the user input.

In some examples, the transaction is associated to a task that the user is likely to complete, including but not limited to purchasing, healthcare following professional's orders or physical therapy plan, betting, billpay, or financial transactions. The multimedia includes at least one video executed by the at least one application or as part of the personalized graphical user interface. The personalized user interface is based on the user executing at least one application, selecting a setting, selecting an object, sending or receiving the multimedia content, input and interaction with the plurality of application, and meta data associated with the object. Based on the user input, in some examples, at least an area of the personalized graphical user interface indicating the task was complete. The multimedia includes but is not limited to videos, images, gifs, meme, sms, email, text, stickers, websites, messaging, augmented reality, virtual reality, sound, graphics, and light effects. In some examples, the user input may be stored and update the likelihood associated with user preferences.

In some examples, the content includes but is not limited to images, audio, video, graphics, gifs, memes, graphics, light effects, projections, and any objects that are part of the use interface, including any meta data, as executed by the plurality of applications. The personalized multimedia output may be configured to include a notification associated with the transaction type for completing the transaction, then the at least one application remains the same and the device does not redirect the application to a new application or URL. The transaction application is executed while the at least one application is executed on the computing device and appears on the graphical user interface. The transaction application sends and receives data with a remote server for determining multimedia content and storing personal preference data associated with the user and the transaction type. The transaction application may send and receive data with a transaction service remote server and for updating the notification associated with the transaction type. The user completes the task indicated by the notification associated with the transaction type and the user receives a confirmation of completion indicated at the personalized graphical user interface. Further, the confirmation of completion may include at least one multimedia content.

A system for filtering content by the operating system of a computing device, comprising a first database including a plurality of applications with multimedia content, wherein the plurality of applications includes user preferences associated with each respective application, a second database including a transaction application for identifying transaction types associated with multimedia content; a processor configured to receive multimedia content associated with the transaction type and user preferences from a remote server in the local computing device, and a non-transitory computer readable medium coupled to said processor. The non-transitory computer readable medium may compare the multimedia content in one application of the plurality of applications being executed on the computing device with the transaction types association with the user preferences to the second database multimedia content received contextual identifiers associated with the user selected group of filter identifiers. The non-transitory computer readable medium may compare the transaction types associated with multimedia content, with an executing application of the plurality of applications on the computing device, and generate a personalized graphical user interface associated with one of the plurality of applications executing on the computing device.

In one example, a multimedia content transaction system for filtering content received from a network by a local computing device, said multimedia content transaction system comprising a transaction application of a plurality of applications of the local computing device, at least one multimedia content determination scheme, a plurality of sets of logical multimedia content elements, and a remote server coupled to said local computing device and said network. The transaction application of the local computer may associate each one of said multimedia content elements to at least one multimedia content scheme, said local computing device receiving personalized multimedia content associated with logical multimedia elements from a remote server of the network, and executing said multimedia content determination scheme utilizing said associated set of logical multimedia content determination elements when the transaction application of the local computing device executes.

In other examples, the computer program product embodied in a transaction application of a computing device with the remote server coupled to the computing device further may cause the processor to determine a respective weighted probability for the determined multimedia content associated with a transaction type. The processor may select personalized multimedia content from the determined multimedia content, determine a graphical element based on the weighted probabilities and the selection of personalized multimedia content, and output the graphical element that includes at least one of a video and a transaction indication area for completing a transaction.

In other examples, a multimedia content based transaction system with authentication access to an account associated with a user, wherein the system may include a multimedia content based transaction application of a computing device and a remote server. In some examples, the multimedia content based transaction application includes instructions and data comprising instructions, which when executed by at least one processor, configure the at least one processor to perform operations of the computing device, the operations comprising execute at least one application of a plurality of applications by a computing device associated with a user with multimedia content. In some examples, the operations may identify an authentication transaction, based on the multimedia content of the at least one application and determine preferences associated with the user and the multimedia content for improving the security of the authentication. In some examples, the multimedia content is associated with the plurality of applications of the computing device and may configure a personalized graphical user interface with at least one layer of authentication for accessing an account associated with the user that includes at least one multimedia display area based on the preferences associated with the multimedia content. The system may further, based on user input at the personalized graphical user interface, configure the personalized multimedia output to include a notification associated with the user input the at least one layer of authentication for accessing the account. Authentication for accessing the account may incorporate stored biometrics of the user, such as fingerprint, image recognition, voice, etc. and my also include user passcodes, pins, etc. The biometrics may be used for accessing the accounts, but the biometric data may also be used to personalize content. One example is the transaction application uses a photo of the user on a ticket purchased while streaming a baseball game.

The term 'network' is intended in its broadest sense. It includes public and private networks, illustratively those applying TCP/IP protocols such as the internet, but not limited to such networks. They may be local area networks (LANs), wide area networks (WANs). The physical implementation of such networks may be fixed, wireless, optical, satellite, mobile or any other suitable form.

Figure 2:
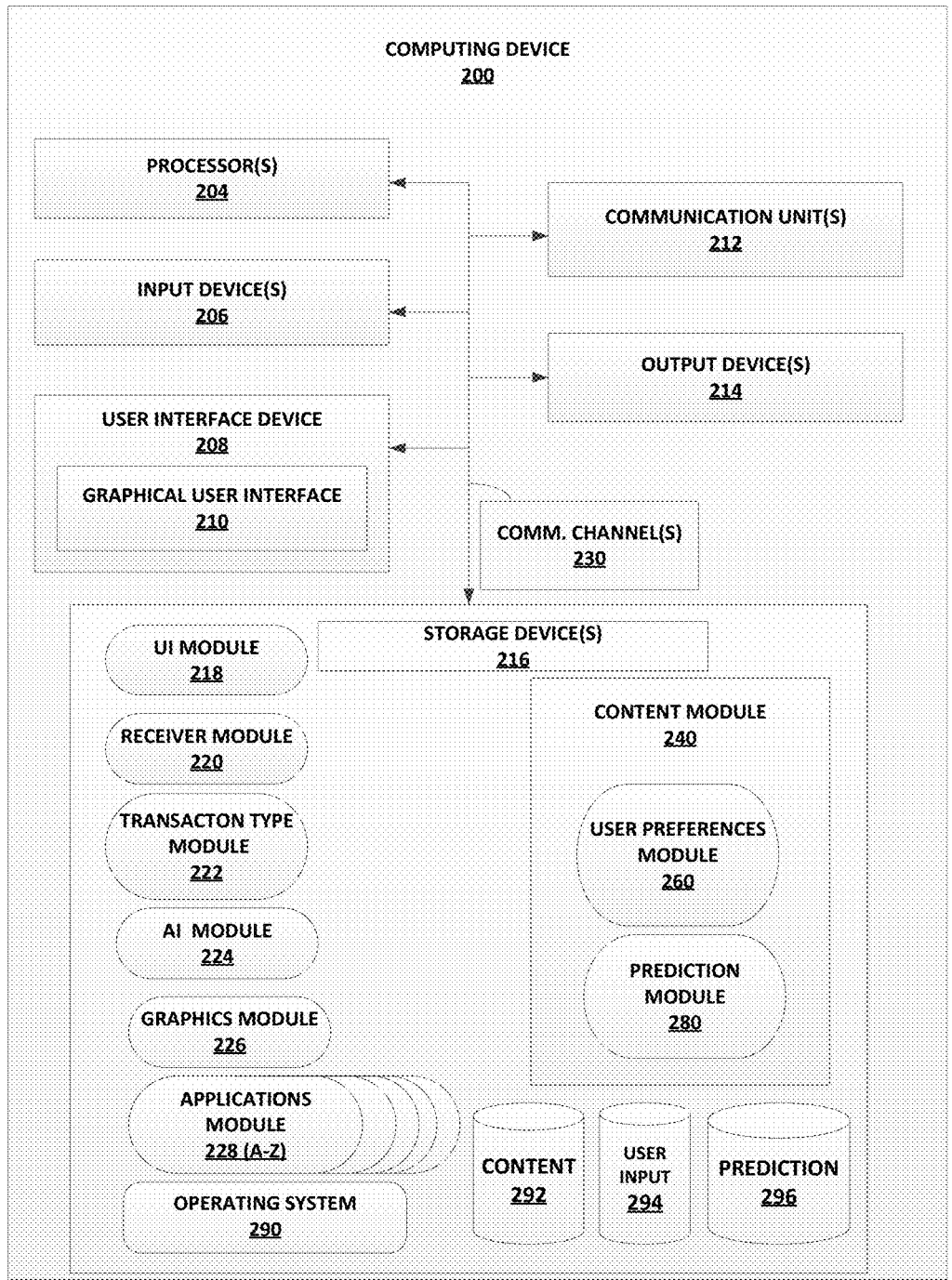
FIG. 2 is a block diagram illustrating an example of a computing device for multimedia content transactions, in accordance with one or more aspects of the present disclosure.

FIG. 2 is an example illustration of computing device 200, which includes the various components. One or more storage devices within the computing device may store information required for use during operation of computing device (e.g., biometric modules of computing device may store information related to operation of the respective one of application modules).

Storage devices, in some examples, have the primary purpose of being short term and not long-term computer-readable storage mediums. Storage devices on computing device may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices may store program instructions and/or data associated with user interface module, biometrics module, identity module, emergency care plan module, contact module, operating system, and applications (e.g., using one of user settings datastore, account datastore, biometrics datastore, identity datastore, emergency car plan datastore, non-biometric data store, other data and patient wishes datastore, contact datastore, and share service datastore). One or more processors may implement functionality and/or execute instructions within computing device. For example, processors on computing device may read and execute instructions stored by storage devices that execute the functionality of user interface, multimedia content, biometrics, preferences, contact and communication, operating system, and other applications. These instructions executed by processors may cause computing device to store information within storage devices during program execution, such as user settings, determined multimedia content, transaction type; determine information; or associated with one or more of applications. Processors may execute instructions of determining multimedia content and transaction types, and send contact communication and data.

Computing device 200 may include user interface ("UI") module 218, receiver module 220, transaction type module 222, AI module 224, graphics module 226, and content module 240. Content module 240 may include user preferences module 260 and prediction module 280. Modules may perform operations described herein using software, hardware, or a mixture of both hardware and software residing in and executing on computing device. Computing device may execute modules with multiple processors. Computing device may execute modules as a virtual machine executing on underlying hardware. UI module 218 may receive data from components associated with computing device, such multimedia data, transaction data, content data, transaction, biometric data or account data. Using the data, UI module 218 may cause other components associated with computing device to provide output based on the data. For instance, UI module 218 may receive data from the user interface device 208 when the user gestures at the graphical user interface 210 to buy the pair of jeans. UI device 208 causes transaction type module 222 to determine a transaction type. AI module 224 may also help to determine a transaction type. UI device 218, and possibly transaction type module 222, may further cause content module 240 to determine multimedia content. Multimedia content is determined by the routines or schemes of the software. For example, user preferences module 260 may determine user preferences techniques by using prediction techniques of prediction module 20. AI module 224 may further help determine multimedia, content, and user preferences to determine personalized multimedia content associated with the user. Content module 240 may send the data for the personalized multimedia content to graphics module 226 to determine a graphical user interface output for the personalized multimedia content associated with the user to send the data for display on the graphical user interface 210 after sent through communication channels 230, to be processed by computing device 200 or a remote servicer communicating through communication unit 212. The modules may be a program with instructions and data instructions and have schemes or software protocols included in the instructions.

In some examples, AI module 224 may send and receive data to predictions module 280. Some data may be subroutines performed by either AI module 224 or prediction module 280 or user preferences module 260 to determine improve the likelihood of the user completing the transaction. The subroutines performed improve the "learning" of what the user prefers and better multimedia retrieval. The predictions are stored in prediction 296 and updated after selections by the user, completing transactions, or not completing transaction by abandoning the jeans in the shopping cart. User input and preferences are stored in user input 294. Determined graphical user interface output and multimedia content are stored at content 292. Content 292, user input 294 and prediction 296 are data stores. The data may be local to computing device 200 or stored remotely. Additionally, there may be a data store for transaction techniques (not pictured) either locally at computing device 200 or at a remote server. Techniques of this disclosure may reduce the amount of time required to complete a transaction and may improve transaction completion rates by strategically using multimedia content at the graphical user interface 210. Techniques of this disclosure may improve content selection by "learning" user preferences over time, e.g., by analyzing the filtering context and previous filter user selections. By selecting personalized content from all multimedia content without limitation to one particular transaction type or one specific application executed on the computing device and by intelligently selecting content, techniques of this disclosure may provide a better user experience and may reduce the effort required by the user to and distraction from completing transactions.

Computing device 200 may use authentication techniques in competing transactions. Biometric information may be stored in user input 294 or have a biometric data store not pictured in FIG. 2. Computing device 200 may use more than one biometric for authentication. The authentication techniques may use multimedia content techniques of content module 240 and send the data to graphic module 226 to determine an output with the authentication transaction type. The data is sent to the user interface 208 to determine an interaction authentication process with multimedia content more likely to be preferred by the user.

FIG. 2 is a conceptual diagram illustrating an example of a computing device configured to execute one or more of filtering content techniques, in accordance with one or more aspects of the present disclosure. As shown in FIG. 1, computing device 200 may be associated with a user, and includes applications 228A-N (collectively, "applications 228"). In this disclosure, the use of "A-N" with respect to different reference numerals should not be understood to imply that there are necessarily an equal number of items for the depicted components. Instead, the letters "A-N" are used for purposes of illustration only to illustrate the plurality of application on computing device 200.

Examples of computing device 200 may include, but are not limited to, portable or mobile devices such as mobile phones (including smartphones), laptop computers, desktop computers, tablet computers, smart television platform, watches, smart glasses, personal digital assistants (PDAs), servers, mainframes, etc.

Figure 3A:
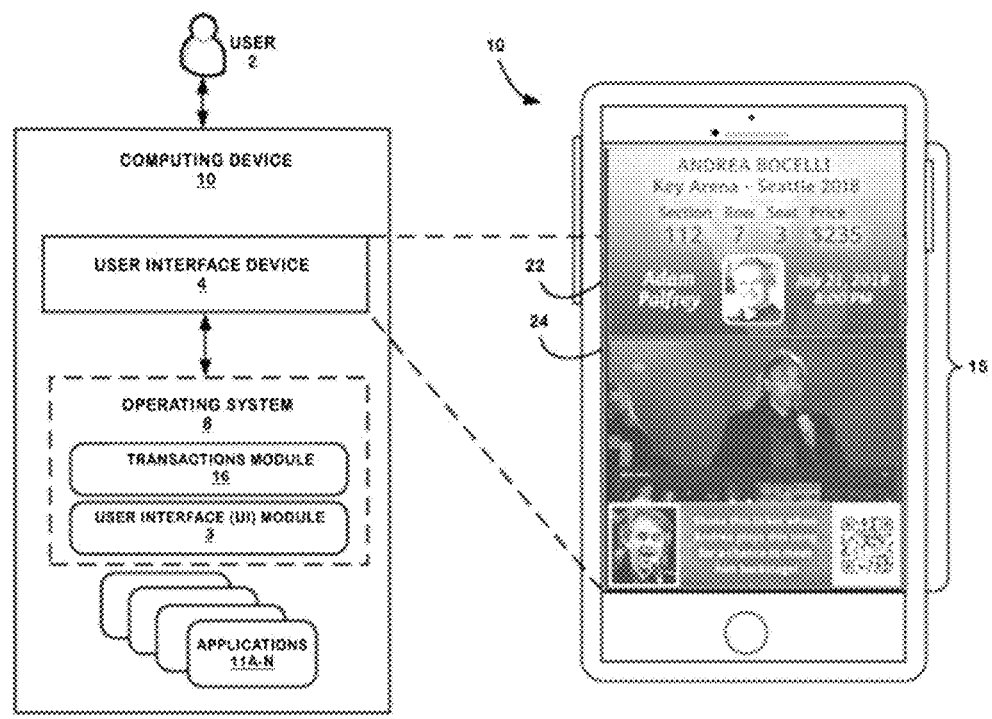
FIG. 3A is a conceptual block diagram for a computing device and a graphical user interface display, in accordance with one or more aspects of the present disclosure.
Figure 3B:
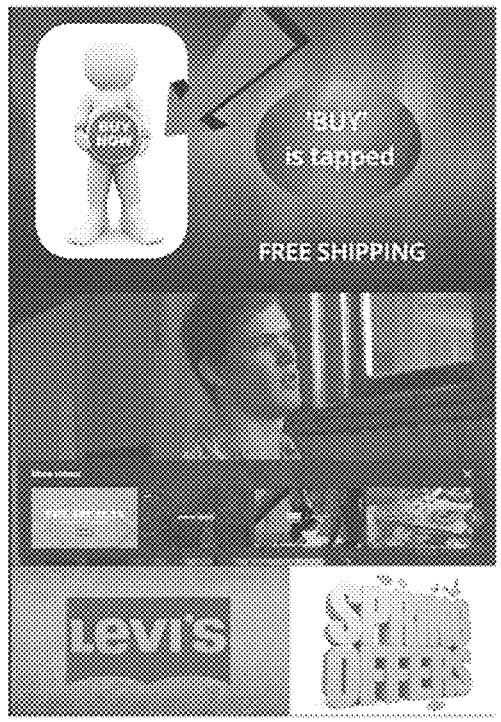
FIGS. 3B & C are additional conceptual illustrations of a graphical user interface display, in accordance with one or more aspects of the present disclosure.
Figure 3C:
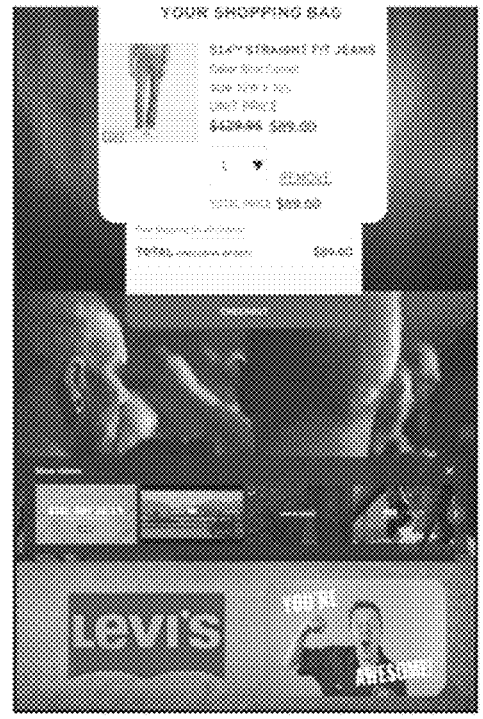

In the examples of FIGS. 3A-3C, conceptual diagrams illustrate a computing device 10 configured to execute one or more of multimedia content based techniques. As shown in FIG. 3A, the computing device 10 may be associated with a user 2 and may include applications 11A-N (collectively, "applications 11"), transactions module 16, and user interface (UI) module 3 that communicates with user interface (UI) device 4. In one example illustrated in FIGS. 3A-3C, user interface device 4 determines what is seen on a graphical user interface display 15 of the computing device 10. In the example of FIG. 3A, user 2 is offered to purchase a ticket to a Bocellli concert 22 as a transaction type while watching a video of Bocelli singing a song 24. The offer to buy a concert ticket 22 may include a personalized photo of the user 2. The photo may also be an authentication method as well as the QR code in the lower right corner. In the example of FIGS. 3A-3C, the use of "A-N" with respect to different reference numerals should not be understood to imply that there are necessarily an equal number of items for the depicted components. Instead, the letters "A-N" are used for purposes of illustration only.

Examples of computing device 10 may include, but are not limited to, portable or mobile devices such as mobile phones (including smartphones), laptop computers, desktop computers, tablet computers, smart television platform, watches, smart glasses, personal digital assistants (PDAs), servers, mainframes, etc. As shown in the example of FIGS. 1-6, computing device 10 may be a tablet computer or a smartphone. Computing device 10, in some examples, can include UI device 4, user interface (UI) module 3, transactions module 16, and applications 11. Other examples of a computing device 10 that implement techniques of the disclosure may include additional components not shown in any of the figures.

In the example of FIGS. 3B-3C, the graphical user interface display 15 may change with an added shopping bag to complete the transaction. The displays in FIGS. 3B-3C relate to a jeans advertisement and FIG. 3B may be a display of a different transaction type of graphical user interface (GUI) display 15 of FIG. 3A. When the user taps on the "BUY" button (FIG. 3B), while the video is playing, then the top portion of GUI display 15 may change to include a virtual shopping bag as illustrated in FIG. 3C and may show, for example, jeans in the user's size (determined from user preference data, such as previously purchased items that may have been sent to the user's home address, and/or frequently purchased sizes).

Figure 4:
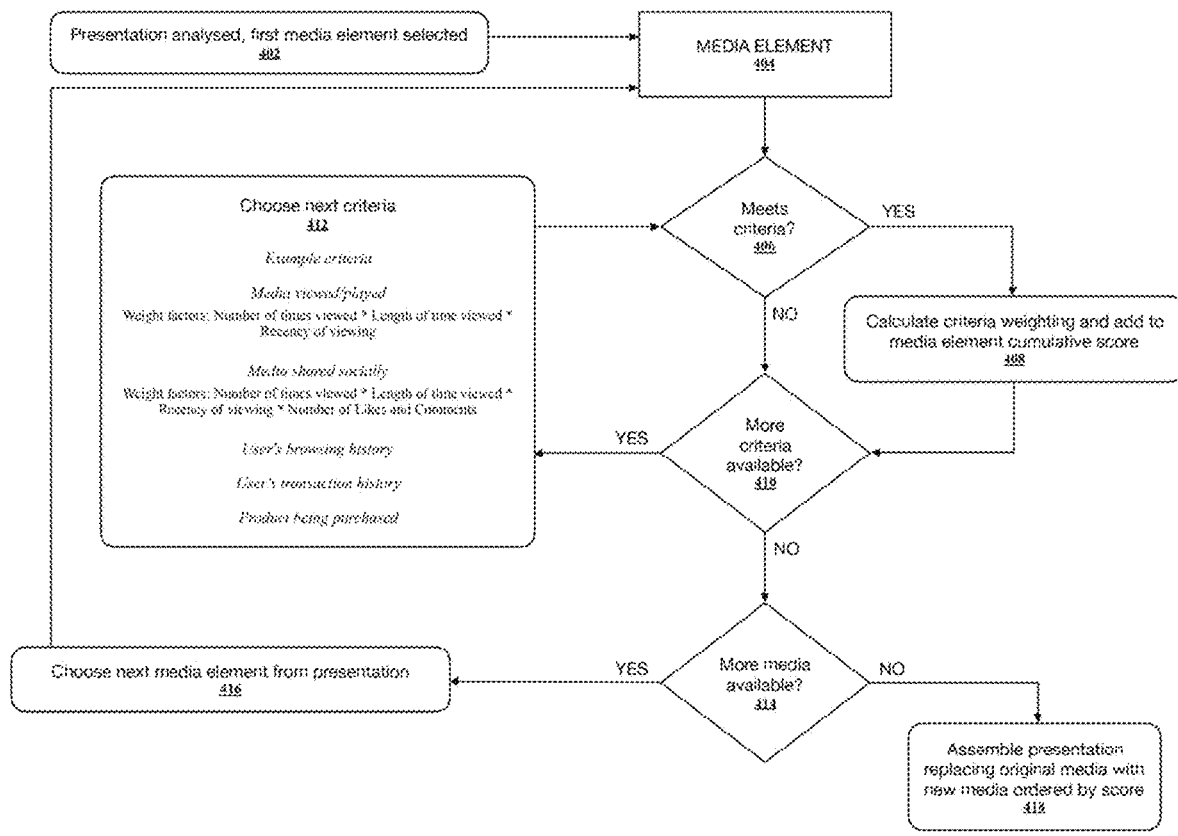
FIG. 4 is a conceptual diagrams illustrating an example operation for AI and machine learning, in accordance with one or more aspects of the present disclosure.

In the example of FIG. 4, the system, application and method may incorporate artificial intelligence (AI) techniques to improve the selection and accuracy of the transaction types, multimedia content and transaction completion rate of the system. When an application is being executed with the user's computing device, then the content of the presentation is analyzed. A first media element is selected 402. The selected media element 404 is then analyzed to determine if it meets the predetermined criteria 406 as acceptable or "preferred" media. If the media element does meet the criteria then the criteria weighting is calculated 408. After criteria weighting is calculated 408 or if the media element does not meet the criteria then the application determines if more criteria is available 410. If more criteria is available, then the application determines which criteria to choose and apply next 602. There may be example criteria available or determined, the media viewed/played and weighting factors (such as number of times viewed, length of time viewed, recency of viewing). Other factors may include media shared socially (and again such as number of times viewed, length of time viewed, recency of viewing, and number of likes and comments). The user's browsing history may also be considered or other interaction with the application, the user's transaction history, product being purchased may all be factors that are applied to choosing the next criteria 412. When the next criteria is determined 412, then the next criteria is applied to the media element 404 to determine if the media element meets the next criteria 406.

If more criteria is not available 410 the application determines if more media is available to be analyzed 414. It there is no more media available, then the application assembles a presentation replacing original media with new media ordered by/based on score 418. If there is more media available 414 then the application may choose the net media element from the presentation 41 (or executing application). The chosen media element will then be the media element selected to be analyzed 404 and the process begins again until there are no more media available and the presentation (display output) is assembled to replace the current display 418.

Figure 5:
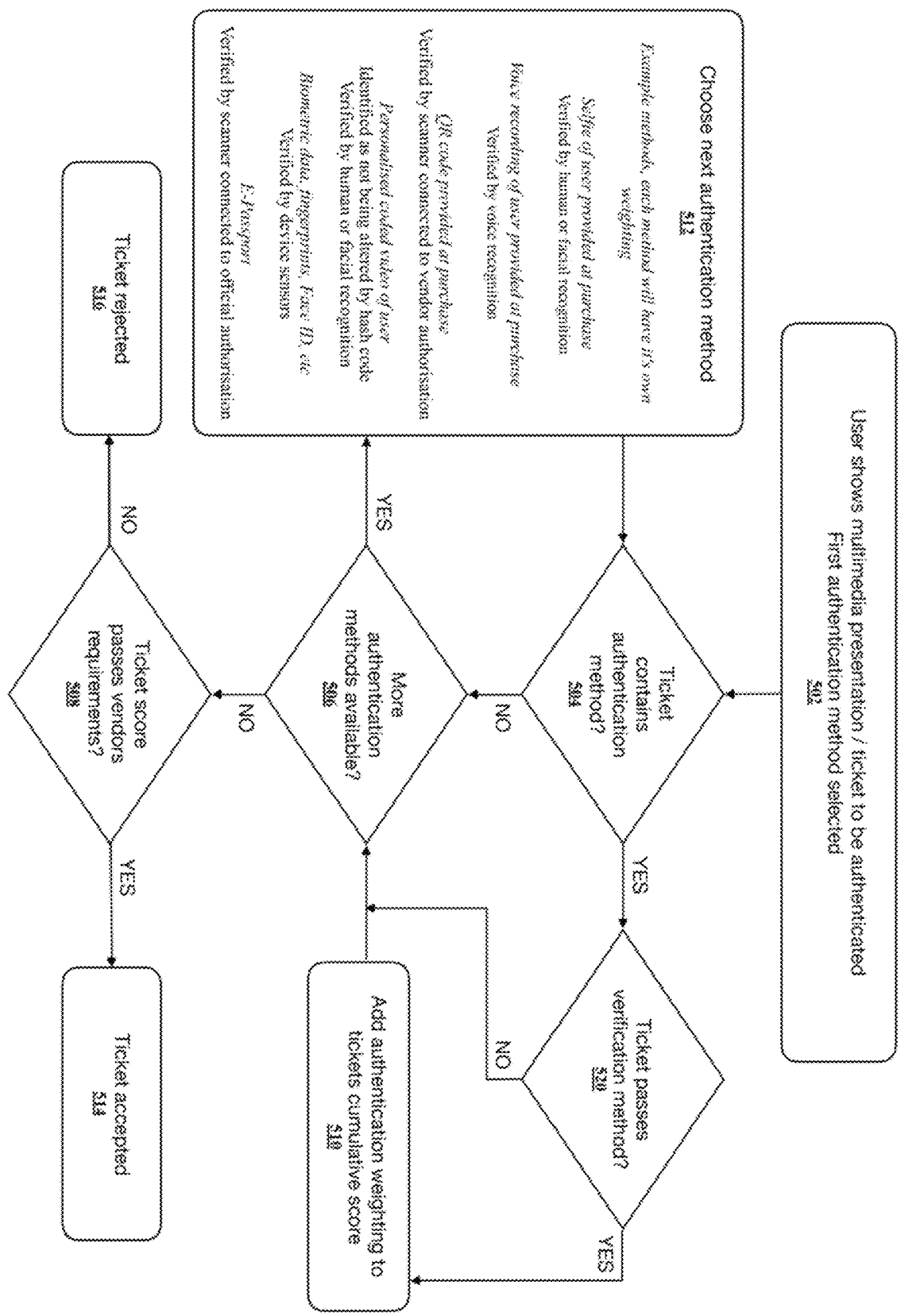
FIG. 5 is a flowchart illustrating an example operation for authentication with multimedia content, in accordance with one or more aspects of the present disclosure.

In the example of FIG. 5, the diagram illustrates a multimedia authentication process implemented with a computing device. Regarding authentication, the importance and number of problems associated with counterfeiting, authentication and identification of individuals across the finance, event, commerce, travel, etc. industries are numerous. Verification of ticketing or any number of transactions improves heightened consequences across the world as society becomes increasingly global and more digitally savvy. However, multi-factor authentication may take time and irritate the user in most instance and leads to frustration for both sides of a transaction or interaction.

It is an object of the authentication aspect of the present invention to provide an engaging multimedia experience at each stage of the customer journey while also seamlessly providing heightened security and verification for companies and governments. Current authentication approaches typically involve 1-2 layers which can potentially be overcome with specialized expertise. Malicious elements are constantly adopting to new security measures without the associated historical risk of being physically present. A new approach is warranted, and it is the aim of this new method and system of identification to implement a wide platitude of markers beyond 2 layers without inconveniencing customers or citizens. This can be achieved by using a hybrid factor approach blended with multimedia elements that far exceeds existing static one-dimensional methods. The plurality of mixing audio, coded video, selfie imagery, and bar or QR codes along with pre-existing ID's and AI or biometric elements into one cloud based ID system raises the bar well above traditional malicious intent or hacking capabilities. Potential use cases could apply to Passports, driver's license, ticketing, transactions, documents, national or student ID's.

In the example of FIG. 5, the user shows multimedia presentation or ticket to be authenticated 502. A first authentication method is selected 502. In a first step, the application determines if the ticket contain authentication 504. Information may be received regarding choosing the next authentication method 512. For example, for all possible methods, each will have its own weighting 512. In another example, authentication method may be determined by a selfie of the user provided at purchase verified by human or facial recognition, voice recording of the user provided at purchase, so the use may be verified by voice recognition 512. In another example of authentication method selection, a QR code may be provided at purchase and be later verified by a scanner connect to vendor authorization system 512. In other examples, personalized coded video of user may be used. The user may be identified as not being altered by hash code and may be verified by human or facial recognition 512. If it does, then the ticket is analyzed to see if it passes the verification method 512. E-passports may also be implemented and can be verified by a scanner connected to official authorization 512.

When the ticket contains an authentication method 504, then the ticket is analyzed if it passes verification method 520. If it does, then the authentication weighting is added to the ticket's cumulative score 510. If there is not an authentication method, then it is analyzed to determine if any other authentication methods are available or applicable for the ticket 506. The application then determines if there is another authentication method to choose from 512. If there are not additional authentication methods available 506 then the ticket is analyzed to determine if the ticket score passes the vendor's requirements 508. If it does, then the ticket is accepted. If the ticket does not pass the vendor score requirements, then the ticket is rejected 516. A rejected ticket will not grant the user access to the application's next step as it will not let the user pass into the next phase.

Messaging Content Stickers (QuickZing) in a first broad form, may provide a sticker which incorporates a link to a message including at least a video. In a preferred form, the content of the sticker is automatically personalized for the recipient and/or the sender.

A method of providing an enhanced sticker within a messaging application, including the steps of: permitting a user to access a selection of stickers; allowing the user to select a sticker; allowing the user to attach a selected sticker to a message; wherein the sticker includes a link which enables launch of a communication, said communication including at least one video component.

In implementations, the communication may be customized automatically by including information specific to the sender, receiver or both. This may be, for example, adding names of the recipient and/or sender, adding specific images or video, adding specific text, or adding specific audio.

In one form, the communication may include a video selected automatically from pre-selected set, so that when the same sticker is used again, a different video may be automatically selected, either from a shuffle, randomly, or using a selection algorithm. In this way, using the same sticker remains none the less fresh.

In suitable implementations, the content of the communication, apart from some level of automated customization, may be provided by the operator. Alternatively, it may be provided by the user, with the content selected and defined in advance of the sticker being attached. In some implementations, the content is a mixture of the above. The image on the sticker may similarly be provided by the user, by the operator, or either at the users option.

It will be apparent that the present invention accordingly provides a way for a sticker to entail a much richer, elaborate set of content than the existing uses of stickers. Moreover, implementations of the present invention allow for the user to have much more control over what material is presented, and to whom it is presented.

The present invention will be described mainly with reference to several specific implementations, and in relation to particular applications to products. It will be understood that the present invention in principle is adapted for implementation on many products, and that the specific type of product may influence the types of content and uses for the present invention. Further, the implementation at the content, social media and network side may be variable and adapted to the requirements and norms of that facility. The present invention is intended to encompass all such implementations.

The present invention may be conveniently implemented using a server based virtual facility, such as the facility operated by the applicant as FabZing. Details of the implementation of this system are provided in the applicant's patent application Nos WO 20112041827 (U.S. 61/272,545) and U.S. provisional application No. 61/746,774 by J Frank Shaffer. These disclosures are hereby incorporated by reference. A suitable implementation of a server based, user controlled multimedia messaging system is the FabZing system, which is available at www.fabzing.com and is commercially operated by the present assignee. Of course, any other suitable system may be used to implement the invention.

The messaging application chosen may be any suitable one, such as the specific examples mentioned above, social media or any other type of online messaging. Sticker is meant is the broadest sense, as a predefined icon or image (or gif or video) which can be selected and attached or added to a message by a user. The present invention is not limited to any particular mode of selection, and in general it is preferred that the normal mode within the selected messaging system is used.

The term operator is used to refer to the party which is providing the server and associated software to deliver the enhanced stickers. This may be multiple parties, depending upon commercial arrangements, and may or may not be the operator of the messaging application. The term is intended to encompass both those in operational control and overall ownership or control.

The term video is used to refer to any kind of moving image format, including for example Mpeg and images format that can be used to form a moving image, such as gifs.

The present invention is envisaged as being implemented primarily as an application which is selected or sold in the usual way for the messaging application. The example provided is in this context. However, the functionality could be incorporated within the functions of the messaging system itself in a suitable implementation.

A quickZing is a particular form of enhanced message which can be associated with a sticker and attached to a message, as will be explained in more detail below. It represents one example of implementation of the present invention.

Figure 6:
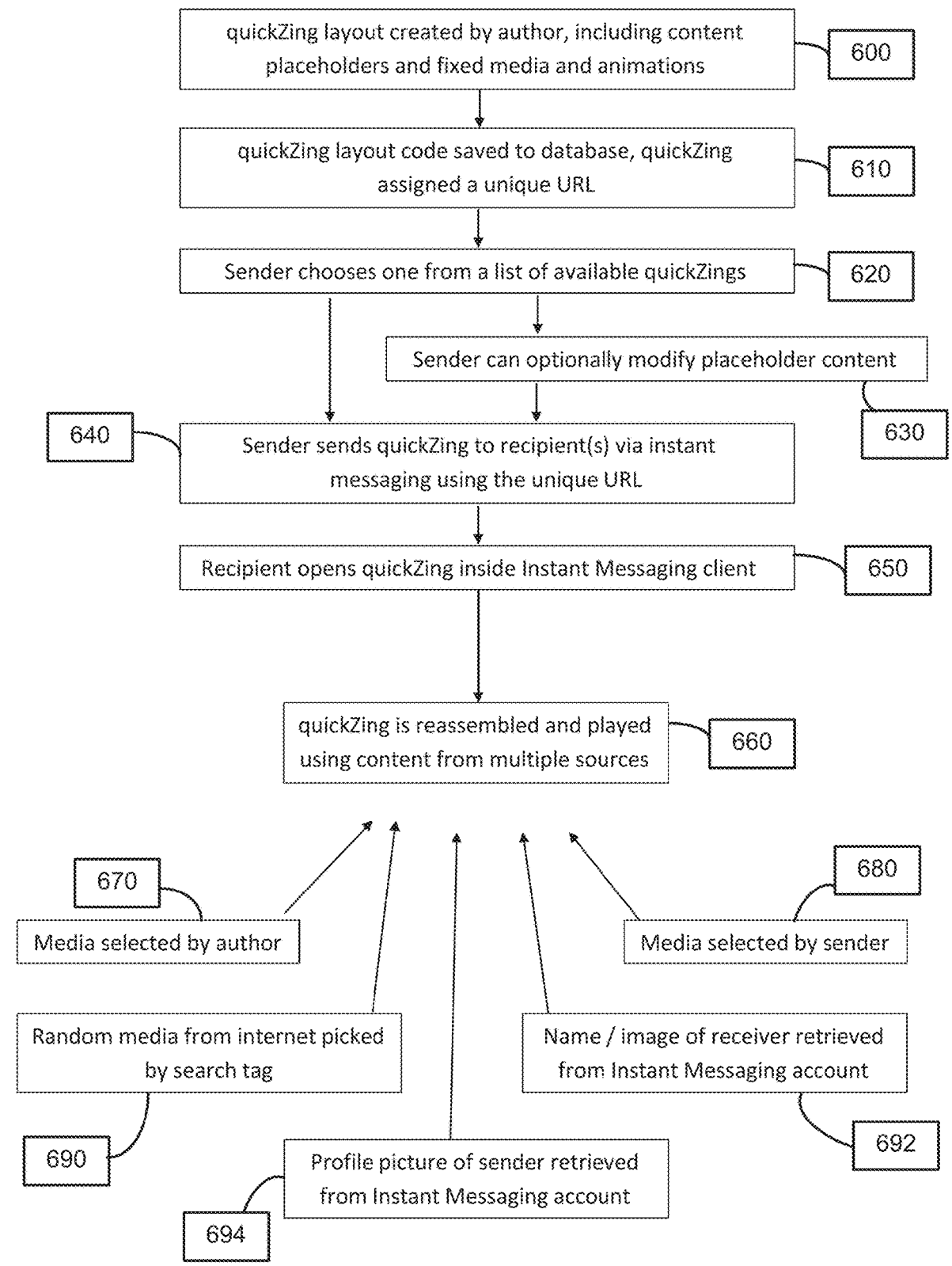
FIG. 6 is a conceptual flow diagram illustrating an example of a messaging sticker technique, in accordance with one or more aspects of the present disclosure.

With reference to FIG. 6, the process by which a quickZing is created, stored, selected and then delivered to a recipient will be described.

The author selects the general layout of their quickZing 620. In one implementation, this may be a person authorised by the operator, in order to maximise the simplicity of the system. However, it can also be the user, as will be described in more detail below.

The layout code is then saved to a database, given a name, and the quickZing assigned a unique URL 610.

At step 620, the sender has available a list of available quickZings, for example as a screen on the smartphone, and selects one. At this stage, the sticker or quickZing is attached to the draft message. In some cases, the sender can modify at step 630 the content within one or more of the placeholders. For example, they may add a photo such as a selfie, or add some text.

The sender then sends the quickZing to the recipient, using the messaging app and with the unique URL associated with the sticker on the message. 640 The recipient then receives their instant message, and clicks the quickZing inside the messaging application.

At the server addressed by the url, the quickZing is assembled and played for the recipient. The layout code defines the various components that must be assembled. These may include, for example, media selected by the author 670, media from the Internet picked by a search tag 690, a profile picture of the sender retrieved from the Messaging app account 694, the name and/or image of the recipient retrieved from the messaging app account 692, and media selected as part of the layout by the sender 680.

It can accordingly be seen that the quickZing are able to be customised to the sender and recipient automatically, for example with their respective names and images inserted into the quickZing. The sender can readily customise a pre-prepared quickZing from the operator, or readily create their own, ready for use as required.

The quickZing may be a simple, pre-packaged set of audio, video and images which is simply selected and sent with customisation of sender, recipient and their images. It may be a pre-formatted layout, in which videos and images can be selected from a search, shuffled within a library, or created as required by the user. The intention is that in many cases, publicly available material will be used. The operation of the implementation disclosed is to simply access URLs, not to copy the material. To further simplify matters, the users may prefer to use public domain material, or their own stored user generated material.

Implementations of the present invention accordingly allow a user to very quickly create a communication including choreographed imagery, sounds, gifs, video, and text passages, all or some of which are personalized and particular to that moment in time between the two parties in a conversation thread. By including variable components such as shuffle, recent, or trending content as one or more of the place holders of the composite messaging, an even more dynamic format is then created with further elements of discovery and serendipity which would potentially add to the interest or engagement level for both the user and the recipient.

The present invention has the capacity, in suitable implementations, to allow very creative content to be produced from sources which have typically been difficult to work with. For example, the present invention can readily use one or more gif files to move in time to a selected music track. Implementations of quickZings could use specific criteria for the rotation, for example trending images with respect to a social media or image sharing website.

It will be appreciated that the use of shuffling or random selection of images from a database (or the network) creates freshness and a feeling of discovery for the sender and recipient. For example, to illustrate a quickZing dealing with getting back after a setback, gifs showing people tripping over and getting up could be cycled, the first time it is a baseball player tripping, the next time it is a fashion model tripping, then a President, then the most recent/popular gif that day and so on.

Similarly, this could be done with the user's own library of images, either for their personal image, or for other images in the quickZing.

A further implementation could effectively gamify everyday messaging conversations by creating unique combinations of a particular randomly generated quote with a winning number of 'smiles' to reward users with prizes or points toward further enhancements. Similarly, in this manner, any unique combination of images, videos, gifs, quotes, songs, and or numbers could in effect yield such an outcome.

The selection algorithm for images could include a variety of characteristics in suitable implementations, including for example sender and recipient's tastes and preferences; a certain weighting to popular gifs with another weighting to what's trending, or any other appropriate criteria.

It will be appreciated that a particular feature of this implementation of the present invention is that the sender can very quickly select a sticker with personalized multimodal content and a message that takes the sender much longer to view and experience than it does to create and send. This is the reverse of the usual situation with a complex communication.

A quickZing is a particular form of enhanced message which can be associated with a sticker and attached to a message, as will be explained in more detail below. It represents one example of implementation of the present invention.

With reference to FIG. 1, the process by which a quickZing is created, stored, selected and then delivered to a recipient will be described.

The author may select the general layout of their quickZing. In one implementation, this may be a person authorised by the operator, in order to maximise the simplicity of the system. However, it can also be the user, as will be described in more detail below.

The layout code is then saved to a database, given a name, and the quickZing assigned a unique URL.

The sender has available a list of available quickZings, for example as a screen on the smartphone, and selects one. At this stage, the sticker or quickZing is attached to the draft message. In some cases, the sender can modify the content within one or more of the placeholders. For example, they may add a photo such as a selfie, or add some text.

The sender then sends the quickZing to the recipient, using the transaction app and with the unique URL associated with the sticker on the message. The recipient then receives their instant message, and clicks the quickZing inside the transaction application.

At the server addressed by the URL, the quickZing is assembled and played for the recipient. The layout code defines the various components that must be assembled. These may include, for example, media selected by the author, media from the internet picked by a search tag, a profile picture of the sender retrieved from the Transaction app account, the name and/or image of the recipient retrieved from the transaction app account, and media selected as part of the layout by the server.

There may be a shuffle button allows the sender to shuffle through content, which already exists as a library, in order to select alternative content if they prefer. The back arrow will move to the previous content or version.

The k button is a feature within kik which allows the user to share with their other friends, not just the recipient.

It can accordingly be seen that the quickZing are able to be customized to the sender and recipient automatically, for example with their respective names and images inserted into the quickZing. The sender can readily customize a pre-prepared quickZing from the operator, or readily create their own, ready for use as required.

The quickZing may be a simple, pre-packaged set of audio, video and images which is simply selected and sent with customization of sender, recipient and their images. It may be a pre-formatted layout, in which videos and images can be selected from a search, shuffled within a library, or created as required by the user. The intention is that in many cases, publicly available material will be used. The operation of the implementation disclosed is to simply access URLs, not to copy the material. To further simplify matters, the users may prefer to use public domain material, or their own stored user generated material.

Implementations of the present invention accordingly allow a user to very quickly create a communication including choreographed imagery, sounds, gifs, video, and text passages, all or some of which are personalized and particular to that moment in time between the two parties in a conversation thread. By including variable components such as shuffle, recent, or trending content as one or more of the place holders of the composite transaction, an even more dynamic format is then created with further elements of discovery and serendipity which would potentially add to the interest or engagement level for both the user and the recipient.

The present invention has the capacity, in suitable implementations, to allow very creative content to be produced from sources which have typically been difficult to work with. For example, the present invention can readily use one or more gif files to move in time to a selected music track.

This allows the user to select placeholders, move them around the screen, change their specific content and adjust parameters. These include font, color, size etc for text, quotes and messages; where the personalised features are inserted; what video, image, audio and other resources from the network are used, and in what timing and combination. The sequencing and speed can also be controlled.

A further implementation could effectively gamify everyday transactions conversations by creating unique combinations of a particular randomly generated quote with a winning number of 'smiles' to reward users with prizes or points toward further enhancements. Similarly in this manner, any unique combination of images, videos, gifs, quotes, songs, and or numbers could in effect yield such an outcome.

The selection algorithm for images could include a variety of characteristics in suitable implementations, including for example sender and recipient's tastes and preferences; a certain weighting to popular gifs with another weighting to what's trending, or any other appropriate criteria.

It will be appreciated that a particular feature of this implementation of the present invention is that the sender can very quickly select a sticker with personalized multimodal content and a message that takes the sender much longer to view and experience than it does to create and send. This is the reverse of the usual situation with a complex communication.

A method of providing an enhanced sticker within a messaging application, including the steps of: Permitting a user to access a selection of stickers; Allowing the user to select a sticker; Allowing the user to attach a selected sticker to a message; Wherein the sticker includes a link which enables launch of a communication, said communication including at least one video component. The communication is customized automatically by including information specific as to the sender, receiver or both. The customizing is selected from one or more of adding names of the recipient and/or sender, adding specific images or video, adding specific text, or adding specific audio. The communication includes a video selected automatically from a pre-selected set, so that when the same sticker is used again, a different video may be automatically selected. The content of the communication, apart from automated customization, is provided and selected by the operator. The content of the communication, apart from automated customization, is provided and selected by the user, in advance of the sticker being attached.

A system for filtering content by the operating system of a computing device, comprising a first database including a plurality of applications with multimedia content, wherein the plurality of applications includes user preferences associated with each respective application, a second database including a transaction application for identifying transaction types associated with multimedia content; a processor configured to receive multimedia content associated with the transaction type and user preferences from a remote server in the local computing device, and a non-transitory computer readable medium coupled to said processor. The non-transitory computer readable medium may compare the multimedia content in one application of the plurality of applications being executed on the computing device with the transaction types association with the user preferences to the second database multimedia content received contextual identifiers associated with the user selected group of filter identifiers. The non-transitory computer readable medium may compare the transaction types associated with multimedia content, with an executing application of the plurality of applications on the computing device, and generate a personalized graphical user interface associated with one of the plurality of applications executing on the computing device.

In one example, a multimedia content transaction system for filtering content received from a network by a local computing device, said multimedia content transaction system comprising a transaction application of a plurality of applications of the local computing device, at least one multimedia content determination scheme, a plurality of sets of logical multimedia content elements, and a remote server coupled to said local computing device and said network. The transaction application of the local computer may associate each one of said multimedia content elements to at least one multimedia content scheme, said local computing device receiving personalized multimedia content associated with logical multimedia elements from a remote server of the network, and executing said multimedia content determination scheme utilizing said associated set of logical multimedia content determination elements when the transaction application of the local computing device executes.

In other examples, the computer program product embodied in a transaction application of a computing device with the remote server coupled to the computing device further may cause the processor to determine a respective weighted probability for the determined multimedia content associated with a transaction type. The processor may select personalized multimedia content from the determined multimedia content, determine a graphical element based on the weighted probabilities and the selection of personalized multimedia content, and output the graphical element that includes at least one of a video and a transaction indication area for completing a transaction.

In other examples, a multimedia content based transaction system with authentication access to an account associated with a user, wherein the system may include a multimedia content based transaction application of a computing device and a remote server. In some examples, the multimedia content based transaction application includes instructions and data comprising instructions, which when executed by at least one processor, configure the at least one processor to perform operations of the computing device, the operations comprising execute at least one application of a plurality of applications by a computing device associated with a user with multimedia content. In some examples, the operations may identify an authentication transaction, based on the multimedia content of the at least one application and determine preferences associated with the user and the multimedia content for improving the security of the authentication. In some examples, the multimedia content is associated with the plurality of applications of the computing device and may configure a personalized graphical user interface with at least one layer of authentication for accessing an account associated with the user that includes at least one multimedia display area based on the preferences associated with the multimedia content. The system may further, based on user input at the personalized graphical user interface, configure the personalized multimedia output to include a notification associated with the user input the at least one layer of authentication for accessing the account. Authentication for accessing the account may incorporate stored biometrics of the user, such as fingerprint, image recognition, voice, etc. and my also user passcodes, pins, etc. The biometrics may be used for accessing the accounts, but the biometric data may also be used to personalize content. One example is the transaction application uses a photo of the user on a ticket purchased while streaming a baseball game.

Various embodiments have been described. These and other embodiments are within the scope of the following claims.

The invention claimed is:

1. A multimedia content based transaction system with authentication access to an account associated with a user, wherein the system includes a multimedia content based transaction application of a computing device and a remote server, wherein the multimedia content based transaction application includes instructions and data comprising instructions, which when executed by at least one processor, configure the at least one processor to perform operations of the computing device, the operations comprising:

executing at least one application of a plurality of applications by a computing device associated with a user with multimedia content;

selecting a media element of the multimedia content associated with the at least one application of the plurality of applications;

determining if the selected media element meets predetermined criteria, by performing the steps of:

first, calculating a criteria weighting associated with the predetermined criteria if the selected media element does not meet the predetermined criteria wherein the predetermined criteria comprises a score of a sum of the criteria including the weighting;

second, determining whether the selected media element meets the predetermined criteria when the criteria weighting is included;

if the selected media element does not meet the predetermined criteria when the criteria weighting is included, then selecting a second media element and repeating the first determining step;

if the selected media element does meet the predetermined criteria, then including the selected media element in the multimedia content;

identifying a transaction requiring an authentication, based on the multimedia content including the selected media element;

determining preferences associated with the user and the multimedia content for improving the security of the authentication, wherein the multimedia content is associated with the plurality of applications of the computing device;

configuring a personalized graphical user interface with at least two layers of the authentication for accessing an account associated with the user that includes at least one multimedia display area based on the preferences associated with the multimedia content and wherein each authentication layer of the at least two layers of the authentication includes its own weight; and configuring, based on user input at the personalized graphical user interface, the multimedia content to include a notification associated with the user input of the at least two layers of the authentication and the weight of each authentication layer for accessing the account.

2. The system of claim 1, wherein the criteria weighting includes at least one of a number of times a similar element was viewed, a length of time the similar element was viewed, a recency of the viewing of the similar element, a number of times the similar element was shared socially, a number of likes of the similar element in social media, a number of comments of the similar element in social media, the user's browsing history, and the user's transaction history.

* * * * *